(12) United States Patent
Nagasawa

(10) Patent No.: US 11,214,226 B2
(45) Date of Patent: Jan. 4, 2022

(54) PASSENGER PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 89 days.

(21) Appl. No.: 16/445,345

(22) Filed: Jun. 19, 2019

(65) Prior Publication Data

US 2020/0101921 A1 Apr. 2, 2020

(30) Foreign Application Priority Data

Sep. 28, 2018 (JP) .............................. JP2018-185724

(51) Int. Cl.
| | |
|---|---|
| *B60R 21/2334* | (2011.01) |
| *B60R 21/231* | (2011.01) |
| *B60R 21/207* | (2006.01) |
| *B60R 21/16* | (2006.01) |

(52) U.S. Cl.
CPC ........ *B60R 21/2334* (2013.01); *B60R 21/207* (2013.01); *B60R 21/231* (2013.01); *B60R 2021/161* (2013.01); *B60R 2021/23107* (2013.01)

(58) Field of Classification Search
CPC ................ B60R 21/207; B60R 21/231; B60R 21/2334; B60R 2021/161; B60R 2021/23107
See application file for complete search history.

(56) References Cited

U.S. PATENT DOCUMENTS

| | | | |
|---|---|---|---|
| 3,981,518 A | | 9/1976 | Pulling |
| 5,333,899 A | * | 8/1994 | Witte ................ B60R 21/23138 280/728.1 |
| 5,499,840 A | * | 3/1996 | Nakano ................ B60N 2/0705 280/730.1 |
| 6,247,727 B1 | | 6/2001 | Hamada et al. |
| 7,134,685 B2 | | 11/2006 | Panagos et al. |

(Continued)

FOREIGN PATENT DOCUMENTS

| | | | |
|---|---|---|---|
| CN | 111819113 A | 10/2020 | |
| FR | 2927592 A1 * | 8/2009 | ........... B60R 21/207 |

(Continued)

OTHER PUBLICATIONS

Office Action for Japanese Patent Application No. 2018-185724 dated Apr. 28, 2020 (6 pages with machine translation).

(Continued)

*Primary Examiner* — Laura Freedman
(74) *Attorney, Agent, or Firm* — Smith, Gambrell & Russell, LLP

(57) ABSTRACT

A passenger protection apparatus for a vehicle includes: an inflator configured to generate gas upon receiving a predetermined actuating signal; and an airbag body folded and configured to deploy by supplying the gas from the inflator to the airbag body. The airbag body includes a predetermined area on which adhesive is applied. The predetermined area adheres to an adherend when the airbag body is deployed. An adhesive force of the adhesive is decreased by a predetermined action.

19 Claims, 9 Drawing Sheets

(56) References Cited

U.S. PATENT DOCUMENTS

| | | | |
|---|---|---|---|
| 7,163,236 B2* | 1/2007 | Masuda | B60R 21/18 |
| | | | 280/733 |
| 7,571,931 B2* | 8/2009 | Watanabe | B60R 21/18 |
| | | | 280/733 |
| 7,681,907 B2* | 3/2010 | Svenbrant | B60R 21/207 |
| | | | 280/728.2 |
| 8,882,138 B1 | 11/2014 | Kicken et al. | |
| 9,290,151 B2* | 3/2016 | Fujiwara | B60R 21/231 |
| 9,428,136 B2* | 8/2016 | Ishida | B60R 21/207 |
| 9,487,177 B2* | 11/2016 | Schneider | B60R 21/231 |
| 9,731,677 B1* | 8/2017 | Belwafa | B60R 21/233 |
| 9,862,347 B2* | 1/2018 | Deng | B60R 21/203 |
| 9,975,519 B2* | 5/2018 | Kobayashi | B60N 2/42 |
| 10,246,043 B2* | 4/2019 | Schneider | B60R 21/207 |
| 10,300,880 B2* | 5/2019 | Mihm | B60R 21/207 |
| 10,800,368 B2* | 10/2020 | Kitagawa | B60R 21/01534 |
| 10,875,486 B2* | 12/2020 | Kim | B60R 21/207 |
| 2004/0232681 A1 | 11/2004 | Adomeit | |
| 2005/0121889 A1 | 6/2005 | Enders et al. | |
| 2006/0255572 A1 | 11/2006 | Svenbrandt et al. | |
| 2007/0013177 A1 | 1/2007 | Abe | |
| 2016/0039383 A1 | 2/2016 | Hicken et al. | |
| 2016/0288762 A1 | 10/2016 | Deng et al. | |
| 2017/0355342 A1 | 12/2017 | Deng et al. | |
| 2018/0056920 A1 | 3/2018 | Paxton et al. | |
| 2018/0162310 A1 | 6/2018 | Szawarski et al. | |
| 2018/0222432 A1 | 8/2018 | Schneider | |
| 2019/0023214 A1 | 1/2019 | Kitagawa | |
| 2019/0283703 A1 | 9/2019 | Marciniak | |
| 2019/0389420 A1 | 12/2019 | Dry et al. | |
| 2020/0101927 A1* | 4/2020 | Nagasawa | B60R 21/237 |
| 2020/0101930 A1* | 4/2020 | Nagasawa | B60R 21/2155 |
| 2020/0101931 A1* | 4/2020 | Nagasawa | B60R 21/2334 |

FOREIGN PATENT DOCUMENTS

| | | |
|---|---|---|
| JP | H07-232615 A | 9/1995 |
| JP | H07-246898 | 9/1995 |
| JP | 2007-022306 A | 2/2007 |
| JP | 2009-154812 A | 7/2009 |
| JP | 2010-047182 A | 3/2010 |
| JP | 2010-132268 A | 6/2010 |
| JP | 2013-018378 A | 1/2013 |
| JP | 2015-112973 | 6/2015 |

OTHER PUBLICATIONS

Final Office Action dated Mar. 22, 2021 for U.S. Appl. No. 16/432,103 (12 Pages).

Final Office Action dated Apr. 2, 2021 for U.S. Appl. No. 16/411,295 (7 pages).

* cited by examiner

PASSENGER PROTECTION APPARATUS

CROSS-REFERENCE TO RELATED APPLICATIONS

The present application claims priority from Japanese Patent Application No. 2018-185724 filed on Sep. 28, 2018, and the entire contents of which are hereby incorporated by reference.

BACKGROUND

The disclosure relates to a passenger protection apparatus.

In order to protect a passenger from a collision and so forth, an airbag apparatus has been used in a vehicle such as an automobile. As this airbag apparatus, a front airbag configured to deploy backward in front of the passenger has been known. This front airbag is deployed at a frontal collision of the vehicle to support and protect the passenger moving forward.

In addition, in order to protect against a side collision, there is an increasing demand for vehicles equipped with side airbags and curtain airbags. This curtain airbag is used to hold the internal pressure for a period of time, several seconds while the vehicle overturns, in order to absorb the impact to the head, and therefore there is a demand for improvement of the airtightness of the airbag and lengthen the expansion duration of the airbag. To address this demand, an airbag having improved strength and airtightness of a joined part with adhesive has been proposed, for example, in Japanese Unexamined Patent Application Publication No. 2010-047182. In addition, an airbag apparatus capable of easily setting the inner pressure of an airbag to a target value by using adhesive has been proposed, for example, in Japanese Unexamined Patent Application Publication No. 2007-022306. In this airbag apparatus, a sheet having an opening located over a vent hole is joined to the edge of the vent hole with a joiner, and, when the inner pressure of the airbag attains or exceeds a predetermined value, the joiner is released. The joiner is adhesive.

SUMMARY

An aspect of the disclosure provides a passenger protection apparatus for a vehicle including an inflator and an airbag body. The inflator is configured to generate gas upon receiving a predetermined actuating signal. The airbag body is folded and configured to deploy by supplying the gas from the inflator to the airbag body. The airbag body includes a predetermined area on which adhesive is applied. The predetermined area adheres to an adherend when the airbag body is deployed. An adhesive force of the adhesive is decreased by a predetermined action after the airbag body is deployed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
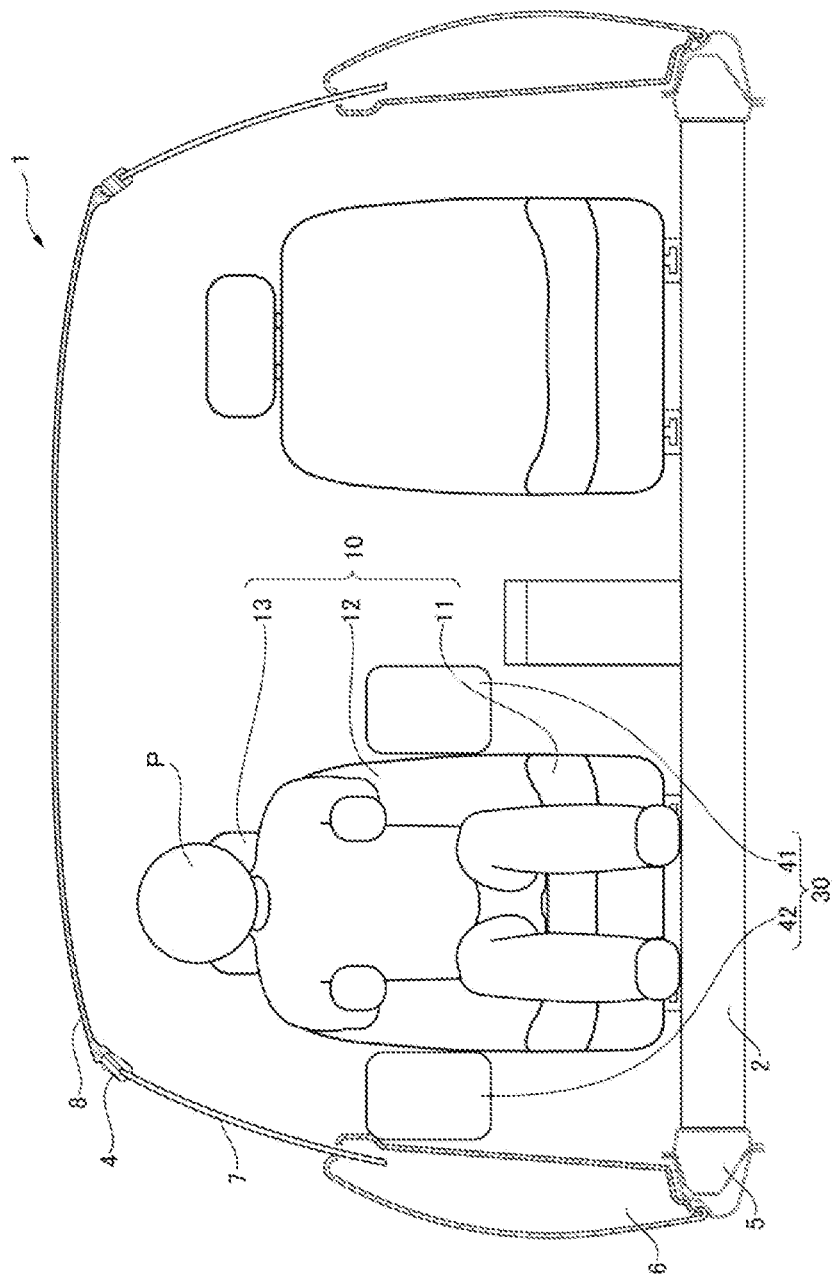
FIG. 1 is a cross-sectional view schematically illustrating a vehicle equipped with passenger protection apparatuses according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Collisions of the vehicle are not limited to a frontal collision and a lateral collision, but various types of collisions in any direction, such as an oblique collision, are conceivable. However, it may not be possible to prepare airbags for each type of collision, because of the high cost and so forth. For example, the motion of the passenger is varied depending on the various types of collisions as described above, and therefore it is difficult for the airbag to surely hold the passenger in an exact contact area that allows the airbag to maximally absorb the collision energy. Consequently, it may not be possible to successfully protect the passenger.

It is desirable to provide a passenger protection apparatus capable of improving the protection performance by surely holding the passenger regardless of varied motions of the passenger due to various types of collisions, and allowing the passenger to readily get out of the vehicle after the impact of the collision is absorbed.

Figure 2A:
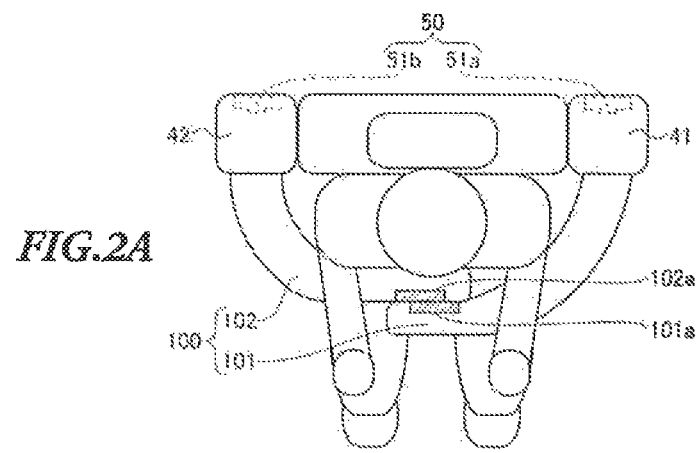
FIG. 2A is a top view illustrating a deployed airbag body of each of the passenger protection apparatuses according to the embodiment.
Figure 2B:
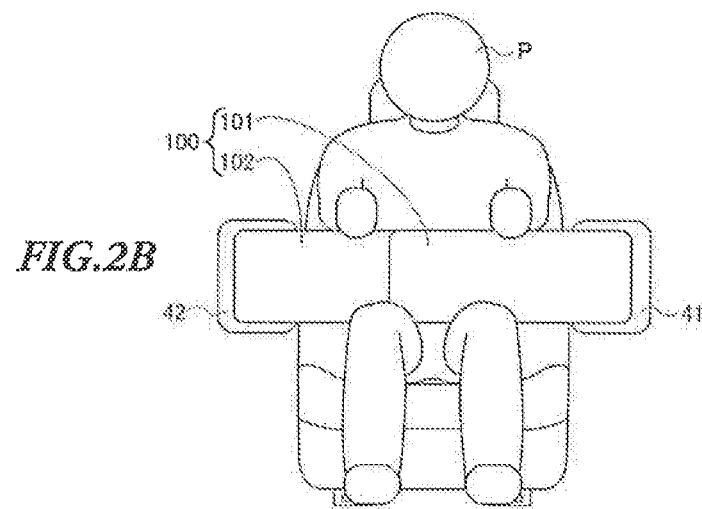
FIG. 2B is a front view illustrating a deployed airbag body of each of the passenger protection apparatuses according to the embodiment.

FIG. 1 is a cross-sectional view schematically illustrating a vehicle equipped with passenger protection apparatuses according to an embodiment of the disclosure. FIG. 2A is a top view illustrating airbag bodies deployed by actuating the passenger protection apparatuses of the embodiment. FIG. 2B is a front view illustrating the airbag bodies deployed by actuating the passenger protection apparatuses of the embodiment.

<Configuration of Vehicle 1>

As illustrated in FIG. 1, seats 10 are provided on a floor surface 2 (on which a floor panel of an under body is mounted) of a vehicle 1. In addition, right and left center pillars forming inside walls of the vehicle body are provided facing one another outside the floor surface 2 in the vehicle width direction. The upper end of each of the center pillars is integrally coupled to a roof side rail 4, and the lower end of the center pillar is integrally coupled to a side sill 5. A front door 6 is provided in front of the center pillar, and a front door window 7 is provided above the front door 6. Moreover, a roof 8 is provided approximately horizontally above the roof side rails 4.

A passenger protection apparatus 30 is provided with each of the seats 10. The passenger protection apparatus 30 for the right seat 10 and the passenger protection apparatus 30 for the left seat 10 are symmetric. Hereinafter, the passenger protection apparatus 30 for the right seat 10 (the left side in FIG. 1) will be described as an example.

The seat 10 includes a seat cushion (seat bottom) 11 on which the hip and thighs of a passenger P rest, a seat back (backrest) 12 configured to recline, and a head rest (head portion) 13 configured to support the head of the passenger P.

<Configuration of Passenger Protection Apparatus 30>

The passenger protection apparatus 30 is controlled by, for example, an ACU (airbag deployment control unit) and an ECU (electronic control unit), based on detection signals from a collision detector for detection and prediction of a collision of the vehicle 1. The passenger protection apparatus 30 includes an inflator 50 and an airbag body 100.

<Inflator 50>

The inflator 50 ignites explosives upon receiving an actuating signal sent based on the detection of a collision of the vehicle 1 by the collision detector, or the prediction of a collision, and generates gas by the chemical reaction due to combustion. The gas generated by the inflator 50 is injected into the airbag body 100. The inflator 50 includes a first inflator 51a and a second inflator 51b described later.

<Airbag Body 100>

The airbag body 100 has a pouch shape into which the gas is injected by the inflator 50. When the airbag body 100 is not actuated, it is compactly folded. To actuate the airbag body 100, the inflator 50 injects the gas into the folded airbag body 100, so that the airbag body 100 is deployed to surround the sitting position of the passenger P. For example, the cloth of the inward side of the airbag body 100 facing the passenger P is shorter than the cloth of the outward side opposite to the passenger P, so that the airbag body 100 can deploy to surround the passenger P. The airbag body 100 includes an inward cloth section facing the passenger P, and an outward cloth section approximately opposite to the inward cloth section. Each of the inward cloth section and the outward cloth section has a base end portion into which the gas is injected, and a leading end portion. The base end portion and the leading end portion of the inward cloth section are partially sewn on one another outside the airbag body 100 by a tether with an adjusted length. By this mean, it is possible to deploy the airbag body 100 to surround the passenger P. In the airbag body 100, a tether to control the width of the airbag body 100 is provided between the inward cloth section and the outward cloth section. The airbag body 100 has two configurations: configuration A where the base end portion of the inward cloth section is sewn on the leading end portion of the outward cloth section by a tether; and configuration B where the base end portion of the inward cloth section is sewn on the leading end portion of the outward cloth section by the tether at a position closer to the front end than the configuration A. Moreover, the tether is shorter than the length of the airbag body 100 deployed without using the tether, from the point of the outward cloth section facing the point at which the tether is sewn on the base end portion of the inward cloth section to the point at which the tether is sewn on the front end portion of the outward cloth section. By this means, it is possible to deploy the airbag body 100 to surround the passenger P. In this case, the inward cloth section may be shorter than the outward cloth section. Alternatively, the airbag body 100 may be bent only in the configuration A, or may be bent in the configuration B in addition to the configuration A in multiple stages. Here, the airbag body 100 includes a first airbag body 101 and a second airbag body 102 described later.

When the passenger protection apparatuses 30 are not actuated, they are stored in a first storage case 41 and a second storage case 42, respectively. The first storage case 41 is provided on the left side of the seat 100 (the right side of the passenger P in FIG. 1), and the second storage case 42 is provided on the right side of the seat 100 (the left side of the passenger P in FIG. 1) in the traveling direction of the vehicle 1. The first inflator 51a and the first airbag body 101 are stored in the first storage case 41. Meanwhile, the second inflator 51b and the second airbag body 102 are stored in the second storage case 42.

Figure 3A:
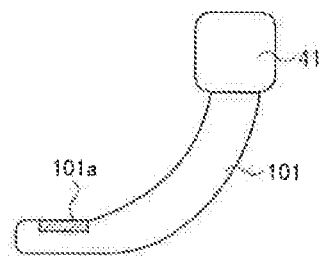
FIGS. 3A and 3C are top views illustrating a deploying airbag body.
Figure 3B:
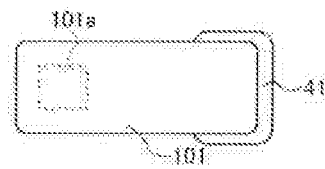
FIGS. 3B and 3D is front views illustrating a deploying airbag body.
Figure 3C:
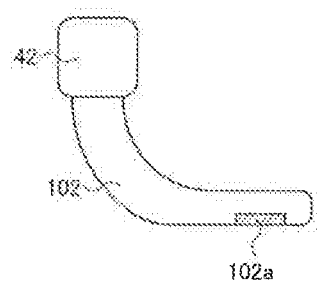
Figure 3D:
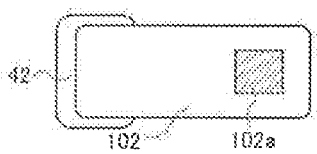

FIG. 3A is a top view illustrating the first airbag body 101 deploying when the passenger protection apparatus according to the embodiment is actuated. FIG. 3B is a front view illustrating the first airbag body 101 deploying when the passenger protection apparatus according to the embodiment is actuated. FIG. 3C is a top view illustrating the second airbag body 102 deploying when the passenger protection apparatus according to the embodiment is actuated. FIG. 3D is a front view illustrating the second airbag body 102 deploying when the passenger protection apparatus according to the embodiment is actuated.

<First Inflator 51a>

The first inflator 51a is configured to generate gas upon receiving an actuating signal sent based on the detection of the collision detector, and to supply the generated gas to the first airbag body 101 to expand the first airbag body 101.

<Second Inflator 51b>

Like the first inflator 51a, the second inflator 51b is configured to generate gas upon receiving an actuating signal sent based on the detection of the collision detector, and to supply the generated gas to the second airbag body 102 to expand the second airbag body 102.

<First Airbag Body 101>

The first airbag body 101 is configured to expand and deploy by the gas injected from the first inflator 51a. One end (fixed side) of the first airbag body 101 is supported by the first storage case 41, and, when the first airbag body 101 is actuated, the other end (deployment side) is deployed to surround the sitting position of the passenger P. The first airbag body 101 includes an adhesive area 101a on which adhesive is applied. The adhesive area 101a is provided on the inward surface facing the passenger P (facing the rear side of the vehicle 1) near the leading end portion (deployment side) of first airbag body 101. That is, adhesive is applied to a predetermined portion of the first airbag body 101, and when the first airbag body 101 is deployed, the predetermined portion adheres to an adherend.

This adhesive has no adhesive force or a low adhesive force at ordinary temperatures, but increases the adhesive force when the temperature is raised. For example, the adhesive force of the adhesive may be high in a first direction, but be low in a second direction different from the first direction. The property of the adhesive will be described in detail later. A vent hole (not shown) is formed in the first airbag body 101. Therefore, after the first airbag body 101 is expanded by the injection of the gas from the first inflator 51a, the gas is discharged from the vent hole to deflate the first airbag body 101.

<Second Airbag Body 102>

The second airbag body 102 is configured to expand and deploy by the gas injected from the second inflator 51b. One end (fixed side) of the second airbag body 102 is supported by the second storage case 42, and, when the second airbag body 102 is actuated, the other end (deployment side) is deployed to surround the sitting position of the passenger P. The second airbag body 102 includes an adhesive area 102a on which adhesive is applied. The adhesive area 102a is provided on the outward surface opposite to the passenger P (facing the front side of the vehicle 1) near the leading end portion (deployment side) of the second airbag body 102. That is, like the first airbag body 101, adhesive is applied to a predetermined portion of the second airbag body 102, and when the second airbag body 102 is deployed, the predetermined portion adheres to an adherend.

Like the adhesive of the first airbag body 101, this adhesive has no adhesive force or a low adhesive force at ordinary temperatures, but increases the adhesive force when the temperature is raised. The adhesive force of the adhesive may be high in a predetermined direction, but be low in a direction different from the predetermined direction. The adhesive applied to the first airbag body 101 and the adhesive applied to the second airbag body 102 may be different in property. For example, the adhesive applied to the first airbag body 101 may exert its adhesive force at a high temperature, and the adhesive applied to the second airbag body 102 may exert its adhesive force at a lower temperature than the first airbag body 101.

Like the first airbag body 101, a vent hole (not shown) is formed in the second airbag body 102. Therefore, after the second airbag body 102 is expanded by the injection of the gas from the second inflator 51b, the gas is discharged from the vent hole to deflate the second airbag body 102.

Here, by actuating the second inflator 51b slightly earlier than when the first inflator 51a is actuated, the second airbag body 102 is deployed earlier than when the first airbag body 101 is deployed. By this means, the first airbag body 101 and the second airbag body 102 can successfully adhere to one another at a desired position.

In addition, with the embodiment, each of the first airbag body 101 and the second airbag body 102 includes the adhesive area on which adhesive is applied, but this is by no means limiting. One of the first airbag body 101 and the second airbag body 102 may include the adhesive area, and the other may not include the adhesive area and therefore adhesive is not applied to the other. In this case, one of the airbag body 101 and the airbag body 102 which does not include the adhesive area has a corresponding area made of a material or formed in a shape which can easily adhere to the adhesive area. By this means, the first airbag body 101 and the second airbag body 102 can more successfully adhere to one another.

<Operation of Passenger Protection Apparatus 30>

In the passenger protection apparatus 30, when the collision detector detects or predicts a collision of the vehicle 1, an actuating signal is first sent to the second inflator 51b to actuate the second inflator 51b, and next an actuating signal is sent to the first inflator 51a to actuate the first inflator 51a.

Upon receiving the actuating signal sent based on the detection or prediction of a collision by the collision detector, the second inflator 51b generates gas and supplies the gas to the second airbag body 102. When the second airbag body 102 is supplied with the gas from the second inflator 51b, the second airbag body 102 expands and protrudes from the second storage case 42. Then, the second airbag body 102 spreads from the right to surround the passenger P and deploys in front of the passenger P.

Next, upon receiving an actuating signal sent based on the detection or prediction of a collision by the collision detector, the first inflator 51a generates gas and supplies the gas to the first airbag body 101. When the first airbag body 101 is supplied with the gas from the first inflator 51a, the first airbag body 101 expands and protrudes from the first storage case 41. Then, the first airbag body 101 spreads from the left to surround the passenger P and deploys in front of the passenger P.

Then, the adhesive applied to the adhesive area 102a of the second airbag boy 102 is melted by the heat of the gas inputted from the second inflator 51b, and then the adhesive area 102a of the second airbag body 102 adheres to the inward surface of the first airbag body 101 facing the rear side of the vehicle 1. Also, the adhesive applied to the adhesive area 101a of the first airbag body 101 is melted by the heat of the gas inputted from the first inflator 51a, and then the adhesive area 101a of the first airbag body 101 adheres to the outward surface of the second airbag body 102 facing the front side of the vehicle 1.

Figure 4:
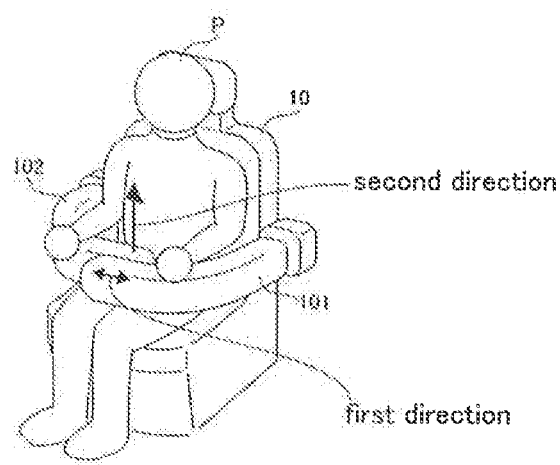
FIG. 4 illustrates the magnitude of the adhesive force of adhesive depending on the direction.

Here, with the embodiment, as illustrated in FIG. 4, the adhesive force of the adhesive is high in a first direction, but is low in a second direction different from the first direction. To be more specific, the adhesive force is strong against a force to separate the first airbag body 101 and the second airbag body 102 into right and left. By this means, even though the passenger P is forced to move forward in a collision of the vehicle 1, the first airbag body 101 and the second airbag body 102 firmly adhere to one another, and therefore it is possible to surely hold the passenger P on the seat 10 and improve the protection performance.

On the other hand, the adhesive force of the adhesive is low in the vertical direction. Therefore, by applying a force to pull the first airbag body 101 and the second airbag body 102 up and down, respectively, the adhesion is released. By this means, it is possible to separate the first airbag body 101 and the second airbag body 102 from one another. Therefore, after holding the passenger P and absorbing the impact of the collision of the vehicle 1, the first airbag body 101 and the second airbag body 102 can be easily separated from one another. By this means, the passenger P can easily leave the seat 10, and readily get out of the vehicle 1.

As described above, in the passenger protection apparatus 30 according to the embodiment, the adhesive exerts its adhesive function by the heat of the gas from the inflator 50, so that the first airbag body 101 and the second airbag body 102 can adhere to one another. Therefore, it is possible to surely hold the passenger P on the seat 10 in a collision, and cope with various types of collisions in different directions, and consequently to improve the protection performance. In addition, the adhesive force of the adhesive used to stick the first airbag body 101 and the second airbag body 102 together is high in the direction to hold the passenger P, but is low in a direction different from the holding direction, for example, a direction vertical to the holding direction. By this means, after the impact of the collision of the vehicle 1 is absorbed, the passenger P can readily get out of the vehicle 1.

Here, in the passenger protection apparatus 30 according to the embodiment, adhesive is applied to the inward surface of the first airbag body 101 facing the passenger P and the outward surface of the second airbag body 102 opposite to the passenger P, but this is by no means limiting. Adhesive may be applied to the outward surface of the first airbag body 101 opposite to the passenger P, and the inward surface of the second airbag body 102 facing the passenger P. In this case, it is preferred that the first airbag body 101 is first deployed, and next the second airbag body 102 is deployed. Alternatively, adhesive may be applied to both the inward surface facing the passenger P and the outward surface opposite to the passenger P of each of the first airbag body 101 and the second airbag body 102. In this case, either of the first airbag body 101 and the second airbag body 102 may be deployed first, or they may be deployed at the same time.

<One-Side Airbag>

Figure 5:
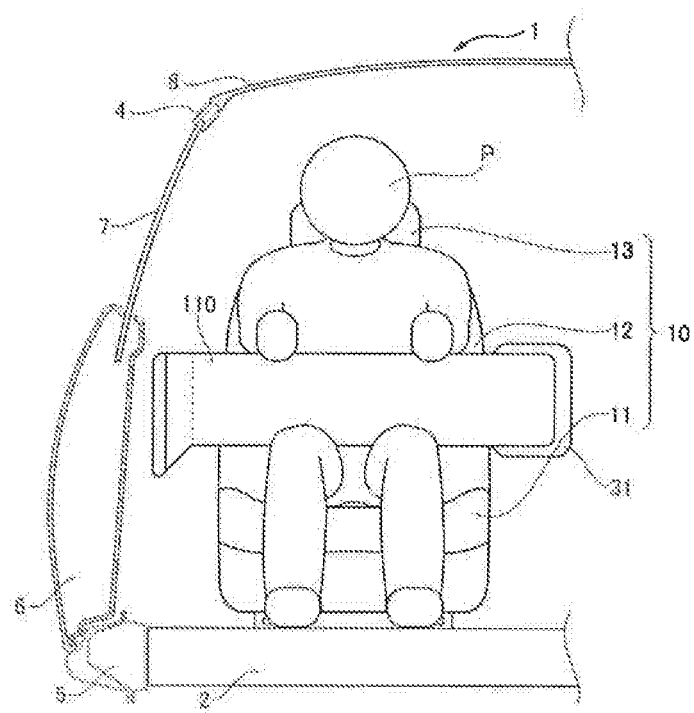
FIG. 5 is a cross-sectional view schematically illustrating a vehicle equipped with a passenger protection apparatus including an airbag body deploying from one side of a passenger.

In addition, with the above-described embodiment, the first airbag body 101 of the passenger protection apparatus 30 is provided on the left side of the passenger P, and the second airbag body 102 of the passenger protection apparatus 30 is provided on the right side of the passenger P, but this is by no means limiting. The airbag body may be provided on only one side of the passenger P. To be more specific, as illustrated in FIG. 5, a passenger protection apparatus 31 may be provided on the left side of the seat 10 (on the right side of the passenger P in FIG. 5), and an inflator and an airbag body 110 may be provided in the passenger protection apparatus 31.

Upon receiving an actuating signal sent based on the detection of the collision detector, the inflator supplies gas to the airbag body 110. When the airbag body 100 is not actuated, it is compactly folded. An adhesive area is provided near the leading end portion of the airbag body 110, and adhesive is applied to the adhesive area. Then, when the airbag body 110 is supplied with the gas from the inflator, the airbag body 110 is deployed to surround the sitting position of the passenger P. Then, the adhesive is melted by the heat of the gas from the inflator, so that the adhesive area adheres to the front door 6.

By this means, in the passenger protection apparatus 31, the adhesive exerts its adhesive function by the heat of the gas from the inflator, and therefore it is possible to surely hold the passenger P on the seat 10, and consequently to improve the protection performance.

<Decrease in Adhesive Force Due to Form Change of Adhesive Surface>

Figure 6A:
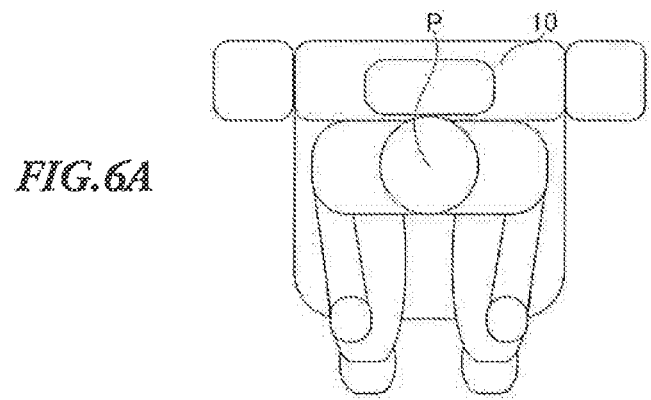
FIGS. 6A-6C are top views illustrating a process of deploying airbag bodies to hold a passenger.
Figure 6B:
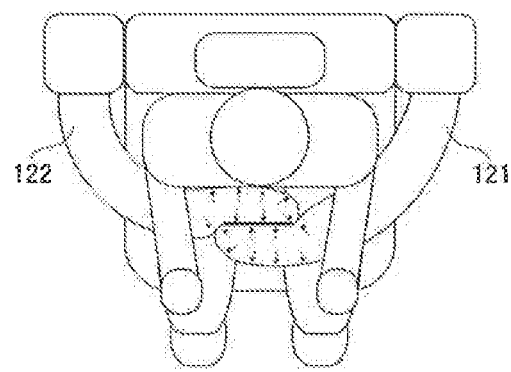
Figure 6C:
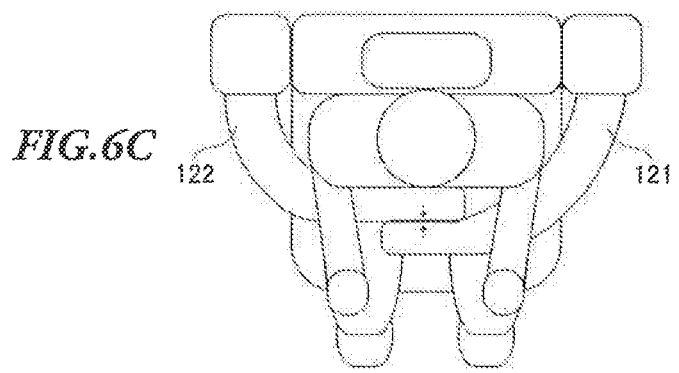
Figure 7A:
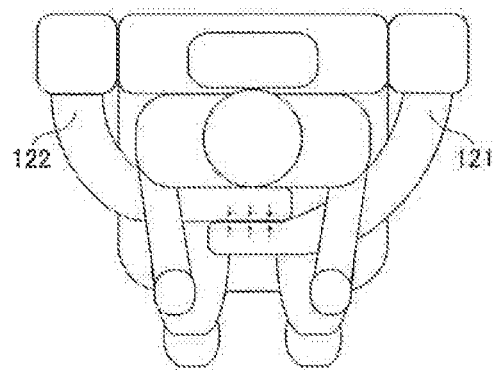
FIGS. 7A-7B are top views illustrating the deployed airbag bodies.
Figure 7B:
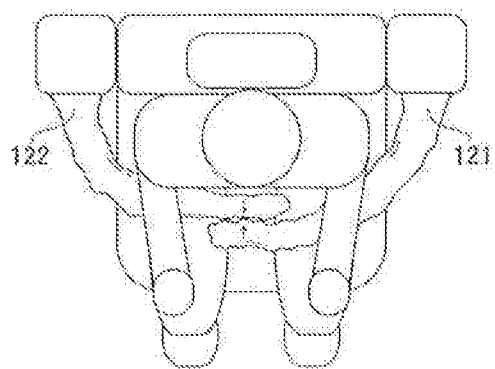

Next, a change in the adhesive force due to the form change of an adhesive surface will be described. FIGS. 6A-6C are top views illustrating a process of deploying an airbag body to hold the passenger P. FIGS. 7A-7B are top views illustrating the deployed airbag bodies. Here, a first airbag body 121 and a second airbag body 122 according to the embodiment are the same as the first airbag body 101 and the second airbag body 102 of the above-described embodiment, except the property of the adhesive applied to them.

First, while the passenger P sits on the seat 10 as illustrated in FIG. 6A, when a collision of the vehicle 1 is detected or predicted, the first airbag body 121 and the second airbag body 122 are deployed.

Just after the deployment, the first airbag body 121 and the second airbag body 122 are filled with the gas, and therefore expand and push one another as illustrated in FIG. 6B. Therefore, in addition to the adhesive force of the adhesive applied to the first airbag body 121 and the second airbag body 122, this pushing force improves the adhesion between the first airbag body 121 and the second airbag body 122. Moreover, the adhesive surface between the first airbag body 121 and the second airbag body 122 are flatten to cure the adhesive in a planar shape.

Next, as the gas is discharged from the vent hole of each of the first airbag body 121 and the second airbag body 122, the pushing force of the first airbag body 121 and the second airbag body 122 is lost as illustrated in FIG. 6C.

Here, as illustrated in FIG. 7A, when the adhesive surface between the first airbag body 121 and the second airbag body 122 is flat, the adhesive force of the adhesive is high. However, the gas is discharged from the first airbag body 121 and the second airbag body 122, the first airbag body 121 and the second airbag body 122 are deflated and shriveled, and therefore the adhesive surface between them is no longer flat. Accordingly, the adhesive force of the planarly cured adhesive is decreased to easily separate the first airbag body 121 and the second airbag body 122 from one another. Consequently, the passenger P can get out of the vehicle 1.

<Decrease in Adhesive Force Due to Temperature Change>

Next, a change in the adhesive force due to temperature change will be described. FIG. 8 are top views illustrating deployed airbag bodies where the adhesive force is changed due to temperature change. Here, a first airbag body 131 and a second airbag body 132 according to the embodiment are the same as the first airbag body 101 and the second airbag body 102 of the above-described embodiment, except the property of the adhesive applied to them.

Figure 8A:
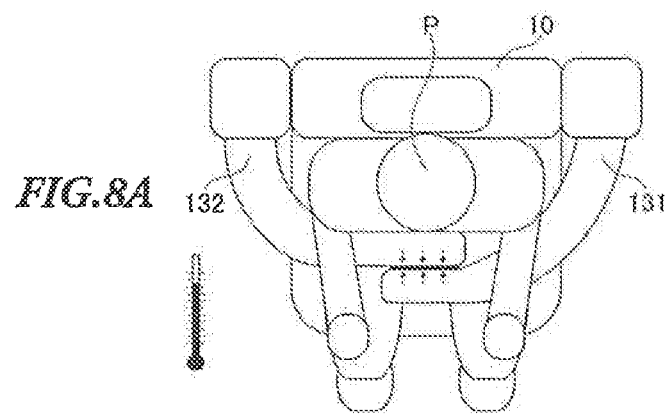
FIGS. 8A-8B are top views illustrating deployed airbag bodies where the adhesive force is changed due to temperature change.
Figure 8B:
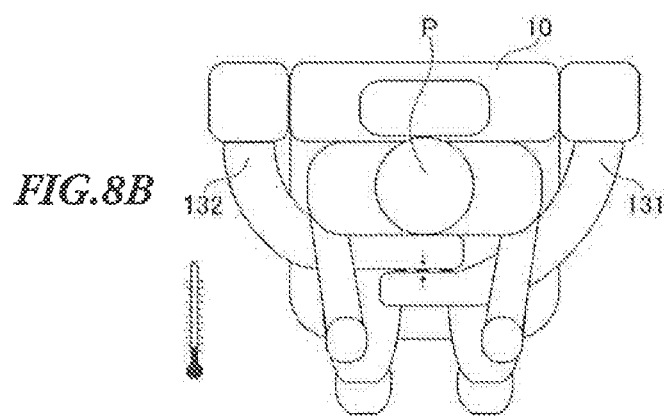

The adhesive force of the adhesive is high when the temperature is high as illustrated in FIG. 8A. On the other hand, the adhesive force is decreased when the temperature is low as illustrated in FIG. 8B. That is, with the embodiment, the adhesive force of the adhesive is enhanced at a high temperature, but is poor in a low temperature. Therefore, just after the first airbag body 131 and the second airbag body 132 are deployed by the actuation of the passenger protection apparatuses, the temperature of the adhesive is high because of the injection of the gas from the inflator. After a while, however, the temperature gradually drops, so that the adhesive force becomes weak. Accordingly, just after the actuation of the passenger protection apparatuses, it is possible to hold the passenger P on the seat 10 with a strong holding force, and as the impact of the collision is absorbed, the holding force is decreased. Consequently, it is possible to release the adhesion of the first airbag body 131 and the second airbag body 132, so that the passenger P can get out of the vehicle 1.

<Change in Adhesive Force Due to Size of Adhesive Area>

Figure 9:
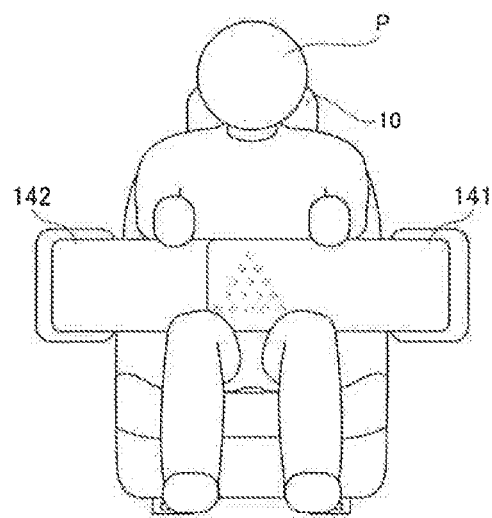
FIG. 9 is a front view illustrating an adhesive area when airbag bodies are deployed.

Next, a change in the adhesive force due to the difference in the size of the adhesive area will be described. FIG. 9 is a front view illustrating an adhesive area when airbag bodies are deployed. Here, a first airbag body 141 and a second airbag body 142 according to the embodiment are the same as the first airbag body 101 and the second airbag body 102 of the above-described embodiment, except the position of the adhesive area.

As illustrated in FIG. 9, each of the first airbag body 141 and the second airbag body 142 includes an approximately triangle adhesive area having the vertex on the top and the base on the bottom. To be more specific, the adhesive is applied to the adhesive area in the form of droplets where the number of droplets is increased from the bottom to the top. That is, with the embodiment, the size of the adhesive area is increased in one direction.

Here, with the embodiment, the adhesive in the form of droplets is applied on the adhesive area, but this is by no means limiting. The adhesive may be applied to the approximate triangle all over. In addition, the shape of the adhesive area is not limited to the triangle. For example, with the embodiment, the upper side of the adhesive area may be narrow and the lower side may be long.

In this way, each of the first airbag body 141 and the second airbag body 142 includes the adhesive area having a narrow top and a wide bottom. Therefore, the adhesive force is low in the upper side but is high in the lower side. By this means, the first airbag body 141 and the second airbag body 142 firmly adhere to one another in the lower side, but can easily peel off from one another in the upper side. Therefore, the first airbag body 141 and the second airbag body 142 firmly adhere to one another to surely hold the passenger P on the seat 10 during the deployment. Meanwhile, after the impact of the collision is absorbed, the passenger P can peel off the first airbag body 141 from the second airbag body 142 in the upper side, and therefore easily get out of the vehicle 1.

With the above-described embodiment, in the passenger protection apparatus, the adhesive exerts its adhesive function by the heat of the gas from the inflator, and therefore it is possible to stick the first airbag body and the second airbag body together. Therefore, it is possible to surely hold the passenger P on the seat 10 in a collision, and cope with various types of collisions in different directions, and consequently to improve the protection performance. Moreover, it is possible to allow the passenger P to readily get out of the vehicle 1 after the impact of the collision is absorbed.

The invention claimed is:

1. A passenger protection apparatus for a vehicle, the apparatus comprising:
    an inflator configured to generate gas upon receiving a predetermined actuating signal; and
    an airbag body stored to one side of a seated passenger and configured to deploy laterally from the one side of the seated passenger across to a front region of the seated passenger by supplying the gas from the inflator to the airbag body,
    the airbag body comprising a predetermined area on which adhesive is applied, the predetermined area adhering to an adherend when the airbag body is deployed,
        wherein an adhesive force of the adhesive is decreased by a predetermined action after the airbag body is deployed, and wherein the adhesive force of the adhesive is higher in a first direction extending along a vertical plane, and is lower in a second direction also extending along the vertical plane, such that the predetermined action includes a decrease in the adhesive force along the second direction as compared to the adhesive force along the first direction, and
    wherein the adhesive has a lateral length of extension that is greater than a length between a free end tip of the airbag body and lateral most inward edging of the adhesive.

2. The passenger protection apparatus for the vehicle according to claim 1, wherein a size of the predetermined area is large in one direction and small in another direction.

3. The passenger protection apparatus for the vehicle according to claim 1, wherein a lateral width of the predetermined area is varied by way of the predetermined area having a triangular configuration.

4. The passenger protection apparatus for the vehicle according to claim 1, wherein the predetermined area is comprised of applied adhesive droplets that are separated apart from each other by exposed regions of the airbag body.

5. The passenger protection apparatus for the vehicle according to claim 1, wherein an adhesive strength of the predetermined area is lowest in an uppermost region of the predetermined area and highest in a lowermost region of the predetermined area.

6. The passenger protection apparatus for the vehicle according to claim 1, wherein the second direction is a vertical direction along the vertical plane and the first direction is a left-to-right lateral direction in the vertical plane.

7. The passenger protection apparatus for the vehicle according to claim 1, wherein the airbag body stored to the one side of the seated passenger is a first airbag body, and the passenger protection apparatus further comprises a second airbag body configured to be deployed from a storage state positioned to an opposite side of the one side of the seated passenger to a final deployment state, wherein the second airbag body also extends laterally across as to surround the front region of the seated passenger by supplying the gas from the inflator to the second airbag body, and wherein the second airbag body supports the adherend to which the predetermined area of the first airbag body adheres.

8. A passenger protection apparatus for a vehicle, the apparatus comprising:
    an inflator configured to generate gas upon receiving a predetermined actuating signal; and
    an airbag body stored to one side of a seated passenger and configured to deploy laterally from the one side of the seated passenger across to a front region of the seated passenger by supplying the gas from the inflator to the airbag body,
    the airbag body comprising a predetermined area on which adhesive is applied, the predetermined area adhering to an adherend when the airbag body is deployed,
    wherein an adhesive force of the adhesive is decreased by a predetermined action after the airbag body is deployed, and wherein:
    the adhesive is cured in a planar shape and exerts its adhesive force when the airbag body is deployed; and
    the adhesive force is decreased due to a change in form of the airbag body after the deployment, and wherein the airbag body has an elongated lateral shape with less vertical height length than lateral extension length, and the adhesive and the adherend are positioned in a central height portion of the airbag body such that the planar shape of the adhesive converts to a non-planar shape with less adhesive strength upon shriveling of the airbag body.

9. The passenger protection apparatus for the vehicle according to claim 8, wherein the predetermined area is adhered to the adherend at a time when the airbag body is fully deployed.

10. The passenger protection apparatus for the vehicle according to claim 8, wherein the adhesive has a lateral length of extension that is greater than a length between a free end tip of the airbag body and lateral most inward edging of the adhesive.

11. The passenger protection apparatus for the vehicle according to claim 8, wherein the planar shape of the cured adhesive is flush with a vertical plane.

12. The passenger protection apparatus for the vehicle according to claim 8, wherein the airbag body stored to the one side of the seated passenger is a first airbag body, and the passenger protection apparatus further comprises a second airbag body configured to be deployed from a storage state positioned to an opposite side of the one side of the seated passenger to a final deployment state, wherein the second airbag body also extends laterally across as to surround the front region of the seated passenger by supplying the gas from the inflator to the second airbag body, and wherein the second airbag body supports the adherend to which the predetermined area of the first airbag body adheres.

13. A passenger protection apparatus for a vehicle, the apparatus comprising:
- an inflator configured to generate gas upon receiving a predetermined actuating signal; and
- an airbag body stored to one side of a seated passenger and configured to deploy laterally from the one side of the seated passenger across to a front region of the seated passenger by supplying the gas from the inflator to the airbag body,
- the airbag body comprising a predetermined area on which adhesive is applied, the predetermined area adhering to an adherend when the airbag body is deployed,
- wherein an adhesive force of the adhesive is decreased by a predetermined action after the airbag body is deployed, and wherein the adhesive force of the adhesive is higher in a first direction extending along a vertical plane, and is lower in a second direction also extending along the vertical plane, such that the predetermined action includes a decrease in the adhesive force along the second direction as compared to the adhesive force along the first direction, and wherein the predetermined area is positioned centrally between upper and lower edging of a free end region of the laterally extending airbag body.

14. The passenger protection apparatus for the vehicle according to claim 13, wherein the airbag body extends fully across the seated passenger.

15. The passenger protection apparatus for the vehicle according to claim 13, wherein the adhesive is in a less adhesive state when the airbag body is in a state of storage and in a more adhesive state during deployment of the airbag body.

16. The passenger protection apparatus for the vehicle according to claim 13, wherein the adhesive is adhered to the adherend only after the airbag body is deployed.

17. The passenger protection apparatus for the vehicle according to claim 13, wherein the airbag body stored to the one side of the seated passenger is a first airbag body, and the passenger protection apparatus further comprises a second airbag body configured to be deployed from a storage state positioned to an opposite side of the one side of the seated passenger to a final deployment state, wherein the second airbag body also extends laterally across as to surround the front region of the seated passenger by supplying the gas from the inflator to the second airbag body, and wherein the second airbag body supports the adherend to which the predetermined area of the first airbag body adheres.

18. A passenger protection apparatus for a vehicle, the apparatus comprising:
- an inflator configured to generate gas upon receiving a predetermined actuating signal; and
- an airbag body stored to one side of a seated passenger and configured to deploy laterally from the one side of the seated passenger across to a front region of the seated passenger by supplying the gas from the inflator to the airbag body,
- the airbag body comprising a predetermined area on which adhesive is applied, the predetermined area adhering to an adherend when the airbag body is deployed,
- wherein an adhesive force of the adhesive is decreased by a predetermined action after the airbag body is deployed, and wherein the adhesive force of the adhesive is higher in a first direction extending along a vertical plane, and is lower in a second direction also extending along the vertical plane, such that the predetermined action includes a decrease in the adhesive force along the second direction as compared to the adhesive force along the first direction,
- wherein a lateral width of the predetermined area is varied by way of the predetermined area having a triangular configuration, and
- wherein the triangle has an upper vertex and a lower base.

19. The passenger protection apparatus for the vehicle according to claim 18, wherein the airbag body stored to the one side of the seated passenger is a first airbag body, and the passenger protection apparatus further comprises a second airbag body configured to be deployed from a storage state positioned to an opposite side of the one side of the seated passenger to a final deployment state, wherein the second airbag body also extends laterally across as to surround the front region of the seated passenger by supplying the gas from the inflator to the second airbag body, and wherein the second airbag body supports the adherend to which the predetermined area of the first airbag body adheres.

* * * * *